United States Patent
Henneken et al.

(10) Patent No.: US 11,229,227 B2
(45) Date of Patent: Jan. 25, 2022

(54) TUMBLER AND METHOD FOR ITS OPERATION

(71) Applicant: Ferdinand Henneken GmbH, Bad Wuennenberg (DE)

(72) Inventors: Kai Henneken, Bad Wuennenberg (DE); Volker Ferdinand Henneken, Bad Wuennenberg (DE)

(73) Assignee: Ferdinand Henneken GmbH, Bad Wuennenberg (DE)

( * ) Notice: Subject to any disclaimer, the term of this patent is extended or adjusted under 35 U.S.C. 154(b) by 194 days.

(21) Appl. No.: 16/295,707

(22) Filed: Mar. 7, 2019

(65) Prior Publication Data

US 2019/0274341 A1 Sep. 12, 2019

(30) Foreign Application Priority Data

Mar. 7, 2018 (DE) .................... 10 2018 105 266.9

(51) Int. Cl.
*A23L 13/60* (2016.01)
*B01F 9/02* (2006.01)
*A22C 9/00* (2006.01)
*B01F 9/00* (2006.01)

(52) U.S. Cl.
CPC .............. *A23L 13/60* (2016.08); *A22C 9/005* (2013.01); *B01F 9/001* (2013.01); *B01F 9/02* (2013.01); *B01F 2215/0014* (2013.01)

(58) Field of Classification Search
CPC ......... A23L 13/60; A22C 9/005; B01F 9/001; B01F 9/02; B01F 5/065; B01F 2215/0014
See application file for complete search history.

(56) References Cited

U.S. PATENT DOCUMENTS 4,994,294 A * 2/1991 Gould .................... A22C 9/005
426/519
5,972,398 A * 10/1999 Ludwig .................... A23B 4/28
426/281

FOREIGN PATENT DOCUMENTS

| CN | 206760615 U | 12/2017 |
|---|---|---|
| DE | 93 14 582 U1 | 3/1994 |
| DE | 199 63 881 A1 | 7/2001 |

* cited by examiner

*Primary Examiner* — Tony G Soohoo
(74) *Attorney, Agent, or Firm* — Muncy, Geissler, Olds & Lowe, P.C.

(57) ABSTRACT

A tumbler for food, including a container designed for receiving the food, which comprises a fluid channel for a fluid provided on the jacket side, a removal opening for the food provided on a first end face, a supply opening for the food provided on a second end face situated opposite the first end face and an extraction opening for a gas provided in the container, including a drive for rotating the container around a rotation axis and including a rotary leadthrough assigned to the second end face, which comprises a connection module, a rotary module, which is provided to be rotatable with respect to the connection module and is rotatable around the rotation axis together with the container.

15 Claims, 8 Drawing Sheets

TUMBLER AND METHOD FOR ITS OPERATION

This nonprovisional application claims priority under 35 U.S.C. § 119(a) to German Patent Application No. 10 2018 105 266.9, which was filed in Germany on Mar. 7, 2018, and which is herein incorporated by reference.

BACKGROUND OF THE INVENTION

Field of the Invention

The present invention relates to a tumbler which includes a container rotating around a rotation axis, which has a fluid channel for a fluid on the jacket side, and a rotary leadthrough via which the fluid is supplied to the container. Food, in particular meat products, is processed with the aid of the tumbler. The invention also relates to an operating method for a tumbler.

Description of the Background Art

Tumblers are used today for the mechanical processing of meat products. The tumbler usually comprises a container (drum), which is designed to receive the food and which rotates around the rotation axis during operation. The container provides, for example, a double jacket having the fluid channel, through which a temperature-controlled fluid flows. During the operation of the tumbler, the double jacket is used to cool or to heat the food as needed.

The food is currently introduced into the container via a filling and removal opening. The filling and removal opening is closable by means of a door and is provided in the area of a first end face of the container. The temperature-controlled fluid is supplied to the rotating drum via a rotary leadthrough, which is provided in the area of a second end face opposite the first end face of the container, for example coaxially to the rotation axis.

SUMMARY OF THE INVENTION

It is therefore an object of the present invention to provide a tumbler which may be better integrated into the manufacturing process for the food. The object of the invention is also to specify an improved operating method for a tumbler.

In an exemplary embodiment, the tumbler comprises a container designed to receive food, which has a fluid channel for a fluid provided thereon on the jacket side, a removal opening for the food provided on a first end face of the container, a supply opening for the food provided on a second end face of the container opposite the first end face and an extraction opening for a gas, in particular air, provided in the container. The tumbler also comprises a drive unit for rotating the container around the rotation axis as well as a rotary leadthrough assigned to the second end face and the feed opening. The rotary leadthrough for the tumbler includes a connection module and a rotary module, which is rotatable with respect to the connection module and may rotate around the rotation axis. A first leadthrough channel for the food, which is run to the supply opening of the container, is provided coaxially to the rotation axis. A second leadthrough channel is also formed as a feed line for the fluid and a third leadthrough channel as a return line for the fluid. The second leadthrough channel has an inlet opening for the fluid provided on the connection module, an annular gap formed between the connection module and the rotary module, a feed section formed on the rotary module and a connecting opening formed between the annular gap and the feed section. The third leadthrough channel has an outlet opening for the fluid provided on the connection module, an annular gap formed between the connection module and the rotary module, a discharge section formed on the rotary module and a connecting opening formed between the annular gap and the discharge section. Seals are also provided for sealing the leadthrough channels against each other.

The special advantage of the invention is that the food is removed from the tumbler via the first end face, and the tumbler is filled with food via the second end face. The tumbler is thus suitable for production lines and can be better integrated into the production process. The food is supplied to the container through the first leadthrough channel coaxially to the rotation axis with the aid of the rotary leadthrough. At the same time, the rotary leadthrough provides a feed line and a return line for the fluid. It is thus possible to supply the food and the fluid to the tumbler via the same end face and even simultaneously. After being processed in the container of the tumbler, the food is then removed via the first end face. The fluid may be supplied continuously.

In particular, the tumbler may be filled by means of a so-called vacuum loading. Air or another gas is extracted from the container via the extraction opening. As a result of the extraction of the gas from the container, the food is sucked in via the first leadthrough channel. For this purpose, a suction line is run from the leadthrough channel to a storage vessel, in which the food is provided. The tumbler may thus be filled very quickly, so that the suitability of the tumbler according to the invention for production lines goes hand in hand with short process cycles or short filling times.

A brine may be introduced as the fluid into the double jacket of the container via the second leadthrough channel and the third leadthrough channel. The rotary module of the rotary leadthrough may be rotatably fixedly connected to the container of the tumbler, while the connection module is used for connection to the peripheral equipment. In particular, a through-opening for the food may be provided on the connection module, next to the inlet opening and the outlet opening for the fluid. The suction line, via which the food is supplied or extracted, may then be connected to the through-opening.

For example, in addition to the food, heated air is introduced into the container of the tumbler as an additional fluid via the first leadthrough channel. In particular, the defrosting of frozen food in the container may be promoted or accelerated by supplying heated air. For example, the heated air may exit or be removed from the container via the extraction line.

The feed section of the second leadthrough channel and the discharge section of the third leadthrough channel are designed in the shape of a half shell or ring segment and are elongated in an axial direction of the rotary leadthrough defined by the rotation axis. For example, the feed section of the second leadthrough channel and the discharge section of the third leadthrough channel surround the first leadthrough channel on the jacket side. A very compact design is advantageously effectuated hereby, which makes it possible to conduct the food and the fluid separately to the rotating container of the tumbler according to the invention.

The connection module can surround the rotary module on the jacket side. A particularly compact design for the rotary leadthrough advantageously results hereby. A the same time, the connection of peripheral equipment to the outer connection module is simplified.

The rotary module can comprise a rotating body, which is preferably designed as a rotary part and has a longitudinal recess provided coaxially to the rotation axis and a sleeve inserted into the longitudinal recess of the rotating body. The feed section of the second leadthrough channel and the discharge section of the third leadthrough channel are then formed between the sleeve and the rotating body. The second leadthrough channel and the third leadthrough channel are separated from each other by webs, which are provided between the sleeve and the rotating body and extend in the axial direction. A very compact design advantageously results by inserting the sleeve into the rotating body. It is thus possible to supply the food and the fluid separately to the rotating container of the tumbler in a very small space.

An inner jacket of the sleeve delimits the first leadthrough channel. In this respect, the sleeve forms a partition wall between the first leadthrough channel, on the one hand, and the second and third leadthrough channels, on the other hand. An outer jacket of the sleeve forms a boundary surface for the second leadthrough channel and the third leadthrough channel.

An intermediate body rotatably fixedly connected to the rotary module is provided, which surrounds the rotary module in the area of the annular gaps of the second leadthrough channel and the third leadthrough channel on the jacket side. A first additional annular gap and a first additional connecting opening are provided for the fluid on the intermediate body as part of the second leadthrough channel as well as a second additional annular gap and a second additional connecting opening as part of the third leadthrough channel. In particular, the connection module may be supported against the intermediate body via pivot bearings and preferably via roller bearings. For example, it may be provided that shaft seals are disposed between the connection module, on the one hand, and the intermediate body, on the other hand, to seal the leadthrough channels against each other. The rotary module as a whole and, in particular the rotating body of the rotary module, may be advantageously protected against wear by providing the intermediate body and, in particular, supporting the connection module against the intermediate body as well as by placing the shaft seals against the intermediate body. If an abrasion occurs, for example due to the relative movement in the area of the shaft seals, the shaft seals, on the one hand, and the intermediate body, on the other hand, may be replaced. However, the rotating body of the rotary module connected to the container of the tumbler does not have to be replaced, resulting in a significant reduction in maintenance work.

Gas and preferably air in a container of the tumbler, which is designed to receive and process food and is rotatable around a rotation axis inclined with respect to the vertical, is extracted from the container via an extraction line, which is run to an extraction opening of the container. As a result of the gas extraction, the food is furthermore sucked into the container via a suction line and a first leadthrough channel formed on a rotary leadthrough of the tumbler. A fluid is also conducted through a fluid channel provided on the container on the jacket side via the rotary leadthrough. For this purpose, the rotary leadthrough has a second leadthrough channel as a feed line for the fluid and a third leadthrough channel as a return line for the fluid. The food is provided from the container via a removal opening provided in the area of a first end face of the container. The food is supplied in the area of a second end face opposite the first end face, to which the rotary leadthrough, including the leadthrough channels, is assigned.

The food may be supplied to the tumbler on two opposite end faces of the container and be discharged therefrom, and a jacket-side cooling of the container via the fluid may take place at the same time. The tumbler is thus suitable for production lines, with the result that the integration of the tumbler into the entire manufacturing or processing process of the food is improved.

At the same time, the container may be very quickly filled with the food by suction or vacuum loading. The economic feasibility of the operating method is further improved hereby. According to the invention, it may be provided in particular, that the food is provided in a storage vessel outside the tumbler and extracted therefrom.

The container of the tumbler can be rotated around the rotation axis, in particular with the aid of a drive, while the fluid flows through the fluid channel of the container, and the food is supplied to the container or discharged therefrom. The cycle time for processing the food may be advantageously reduced by simultaneously supplying and extracting the food, on the one hand, and controlling the temperature of the container via the fluid, on the other hand. At the same time, a targeted cooling or heating of the food is ensured at any time, with the result that an optimum process control is possible, and the quality of the food is maintained.

The food may be defrosted in the tumbler. For this purpose, temperature-controlled air may be supplied to the container as additional fluid via the first leadthrough channel of the rotary leadthrough, which is used to supply the food. The additional fluid may then be discharged from the container via the extraction line. Similarly, the additional fluid may be supplied in cooled form for cooling the food processed in the tumbler.

Additional advantages, features and details of the invention are apparent from the additional subclaims and the following description. Features mentioned therein may each be essential to the invention both individually or in any arbitrary combination. Features and details of the tumbler described according to the invention naturally also apply in connection with the operating method according to the invention and vice versa. Thus, reference may always be made interchangeably to the disclosures of the individual aspects of the invention. The drawing is used only as an example for the purpose of explaining the invention. It is not limiting in nature.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
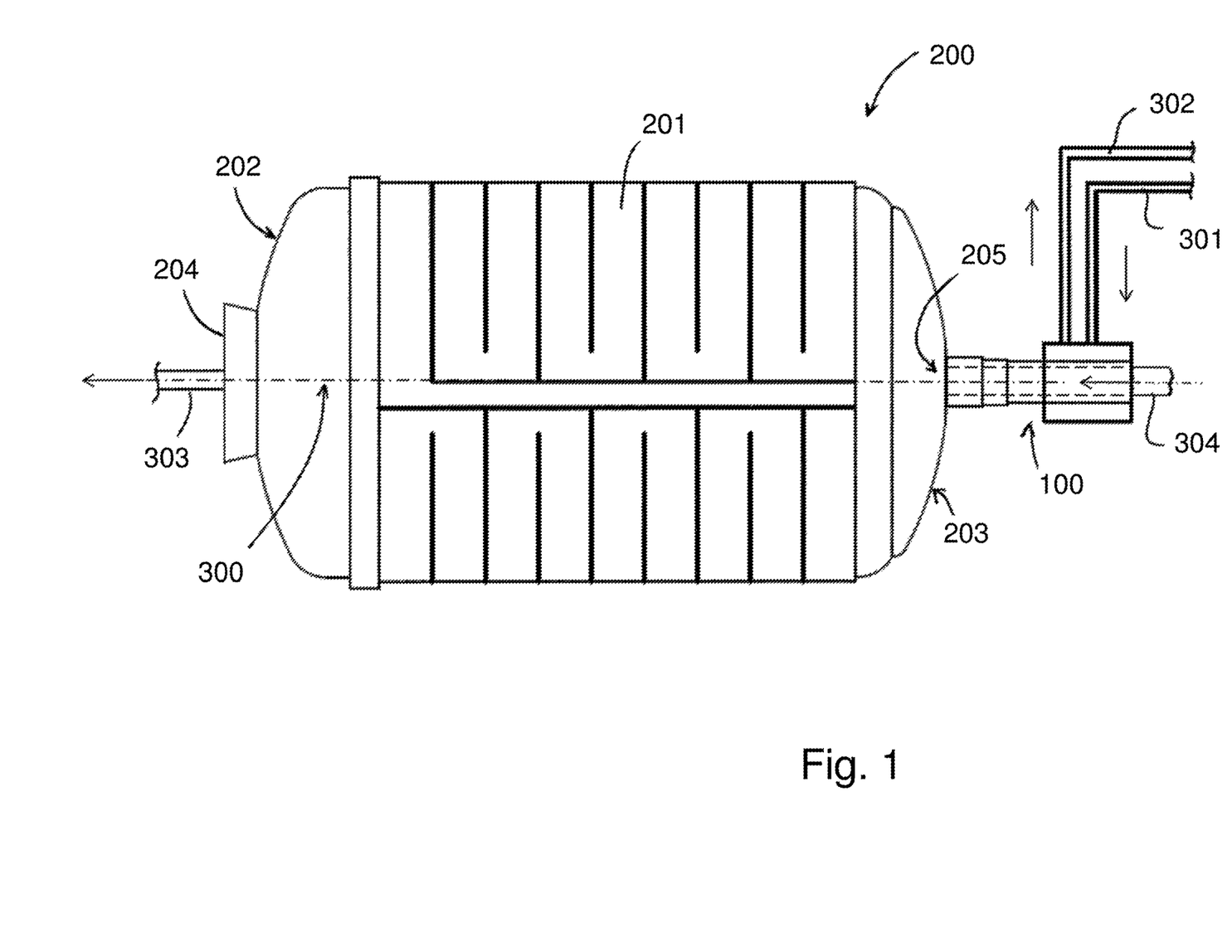
FIG. 1 shows a schematic representation of a tumbler according to the invention, including a rotary leadthrough.

A tumbler according to the invention according to FIG. 1 comprises as essential function components a container 200, which is used to receive and process food, a drive, which is not illustrated and is designed to rotate container 200 around a rotation axis 300, as well as a rotary leadthrough 100. Rotary leadthrough 100 is built onto container 200 of the tumbler.

Container 200 provides two end faces 202, 203 situated opposite each other as well as a fluid channel 201 on the jacket side. A temperature-controlled fluid may be conducted through fluid channel 201 to heat or cool the food during processing. Fluid channel 201 is part of a double jacket of container 201 and has a meandering design.

A removal opening for the food, which is not illustrated, is provided on a first end face 202 of container 200. A removal door 204 is assigned to the removal opening for optionally releasing or closing the removal opening. An extraction opening is also provided on removal door 204. An extraction line 303 is connected to the extraction opening. Air may be pumped out of container 200 of the tumbler via extraction line 303 and a pump, which is not illustrated.

A supply opening 205 is provided on a second end face 203 opposite first end face 202. Food is introduced into the tumbler through supply opening 205.

Figure 2:
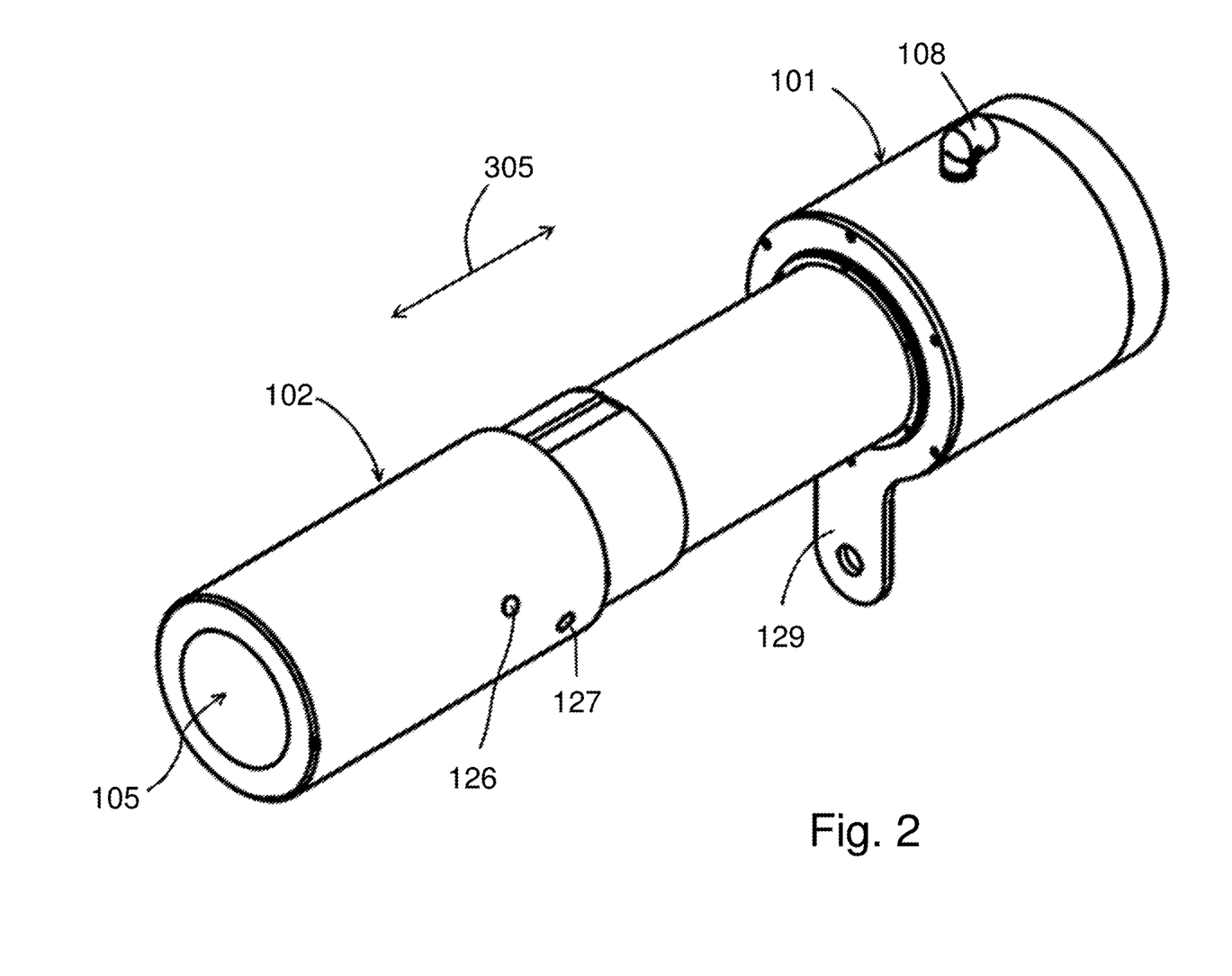
FIG. 2 shows a perspective representation of the rotary leadthrough, including a connection module and a rotary module.
Figure 3:
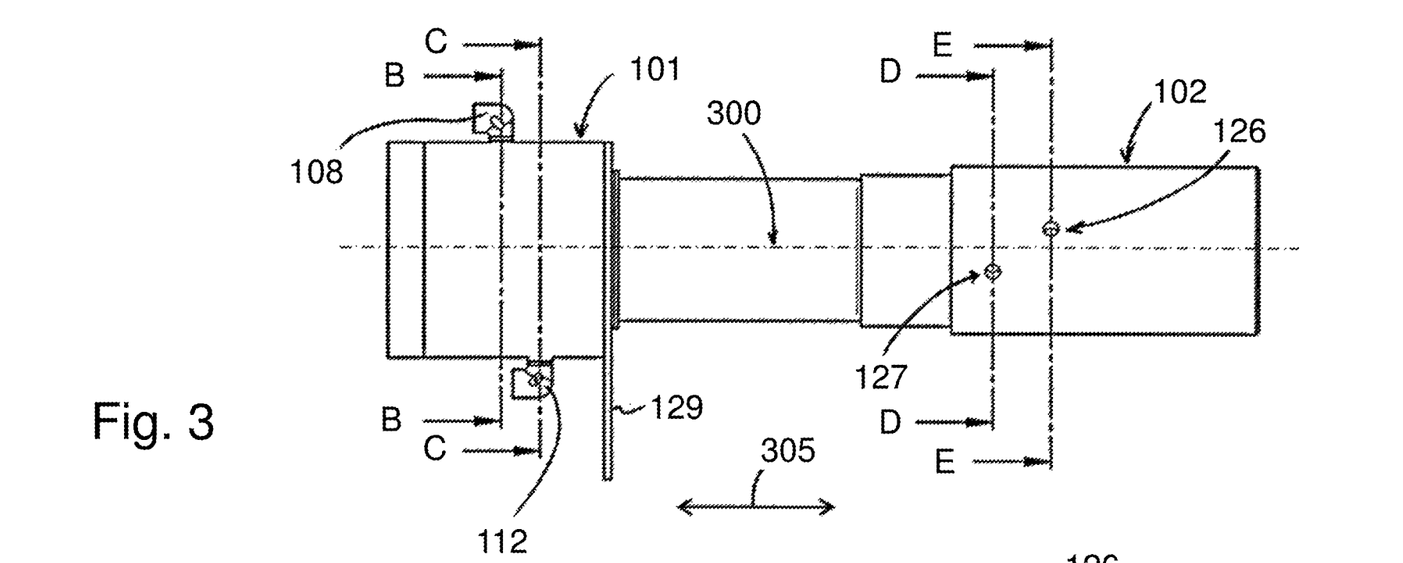
FIG. 3 shows a first longitudinal side view of the rotary leadthrough according to FIG. 2.
Figure 4:
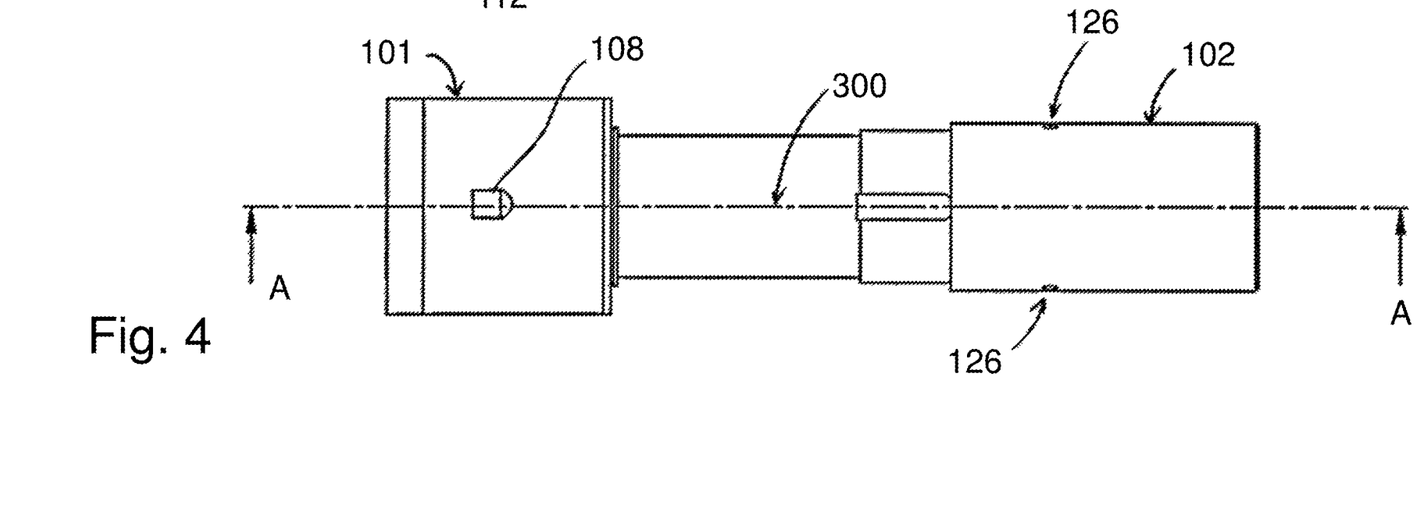
FIG. 4 shows a second longitudinal side view of the rotary leadthrough according to FIG. 2.
Figure 5:
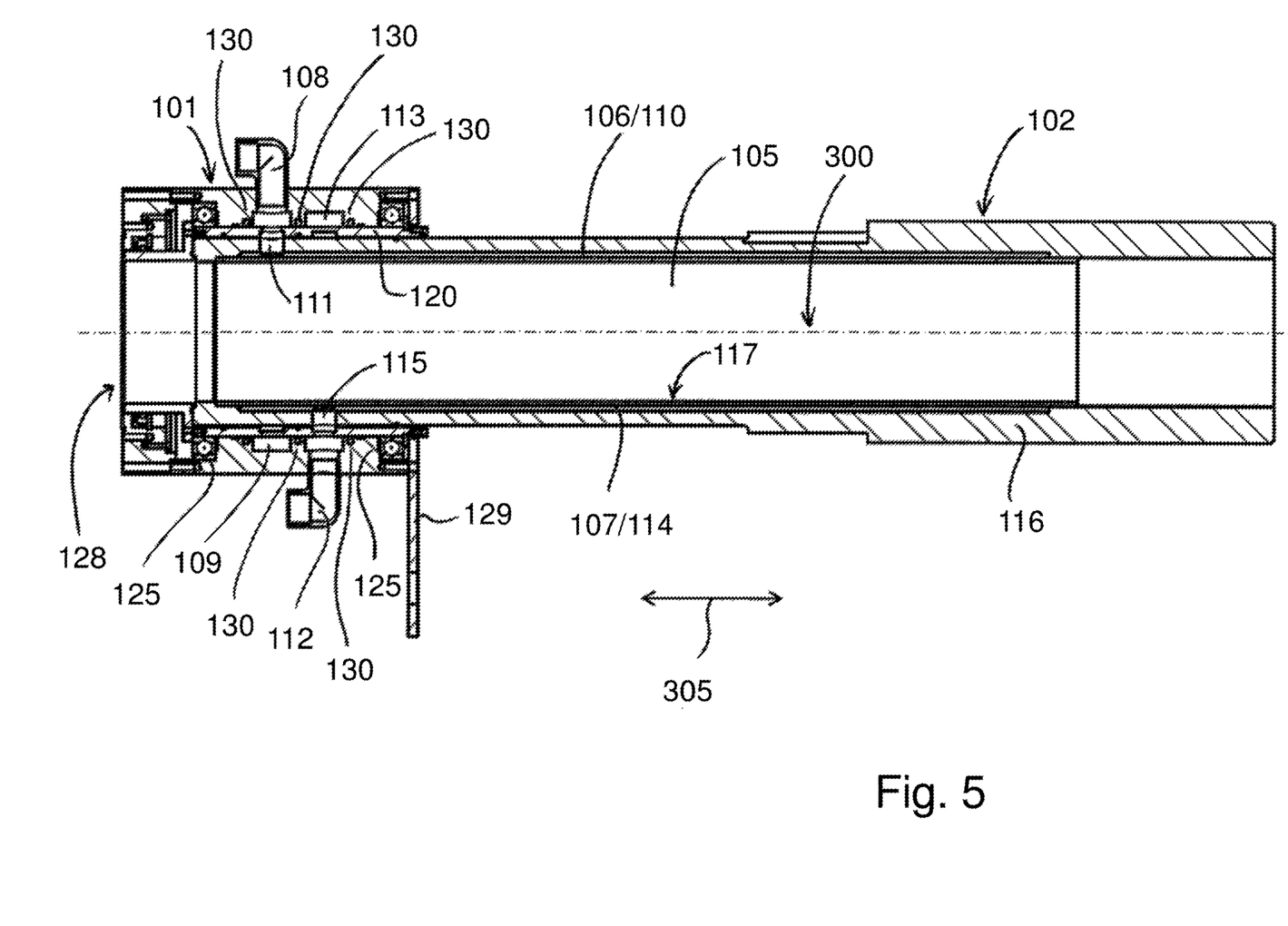
FIG. 5 shows a longitudinal section A-A of the rotary leadthrough according to FIG. 4.
Figure 6:
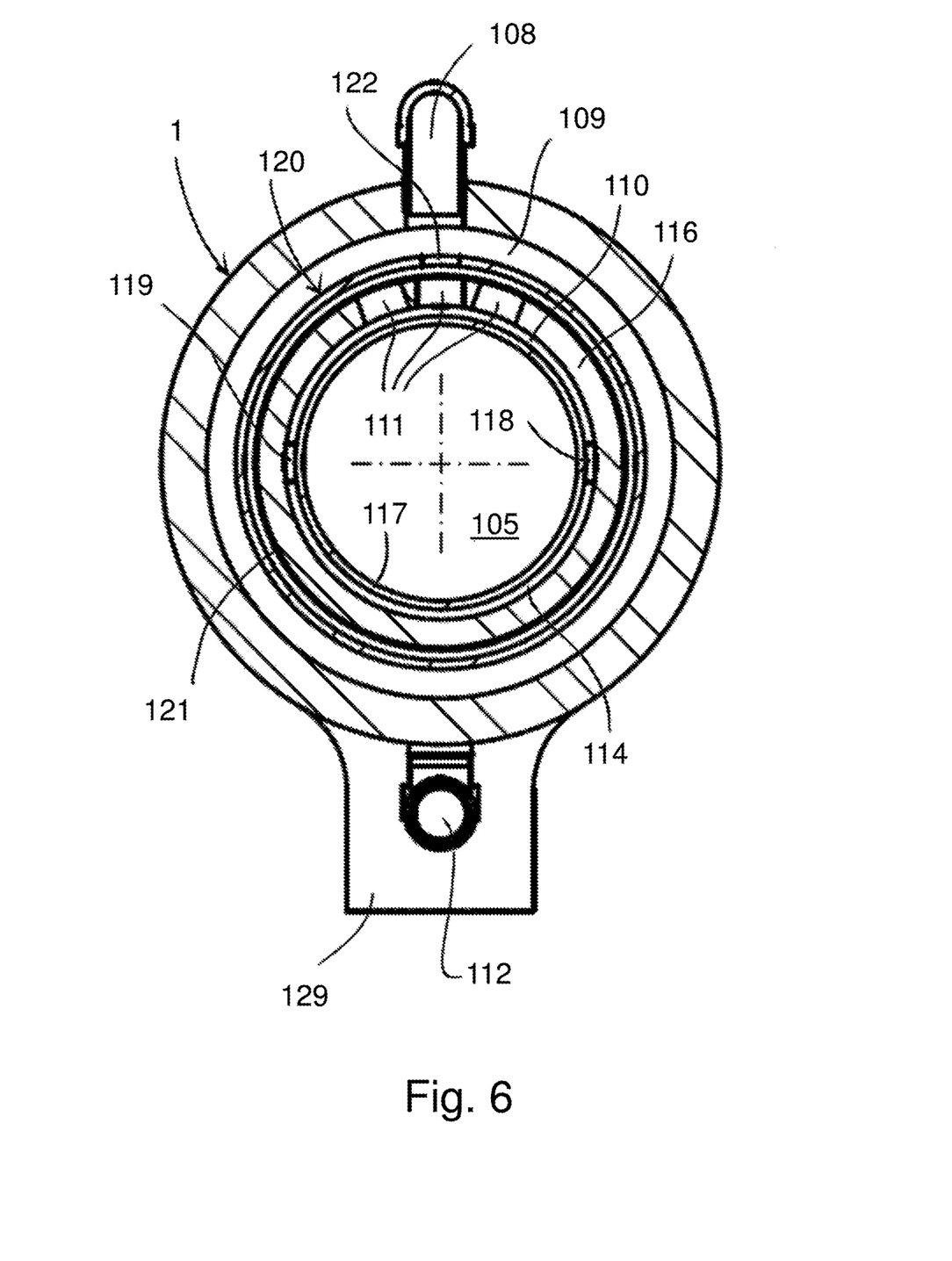
FIG. 6 shows a cross section B-B of the rotary leadthrough according to FIG. 3.
Figure 7:
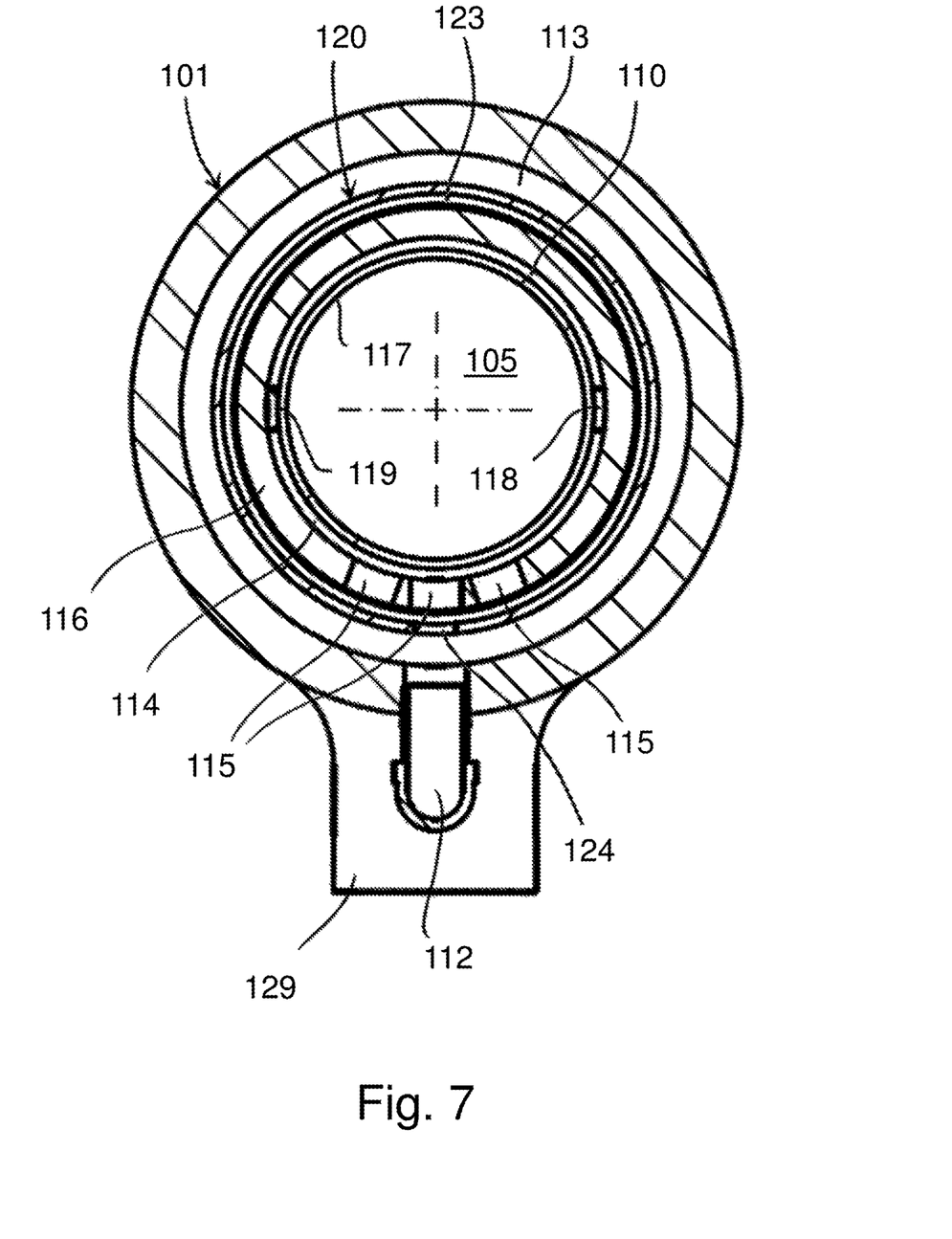
FIG. 7 shows a cross section C-C of the rotary leadthrough according to FIG. 3.
Figure 8:
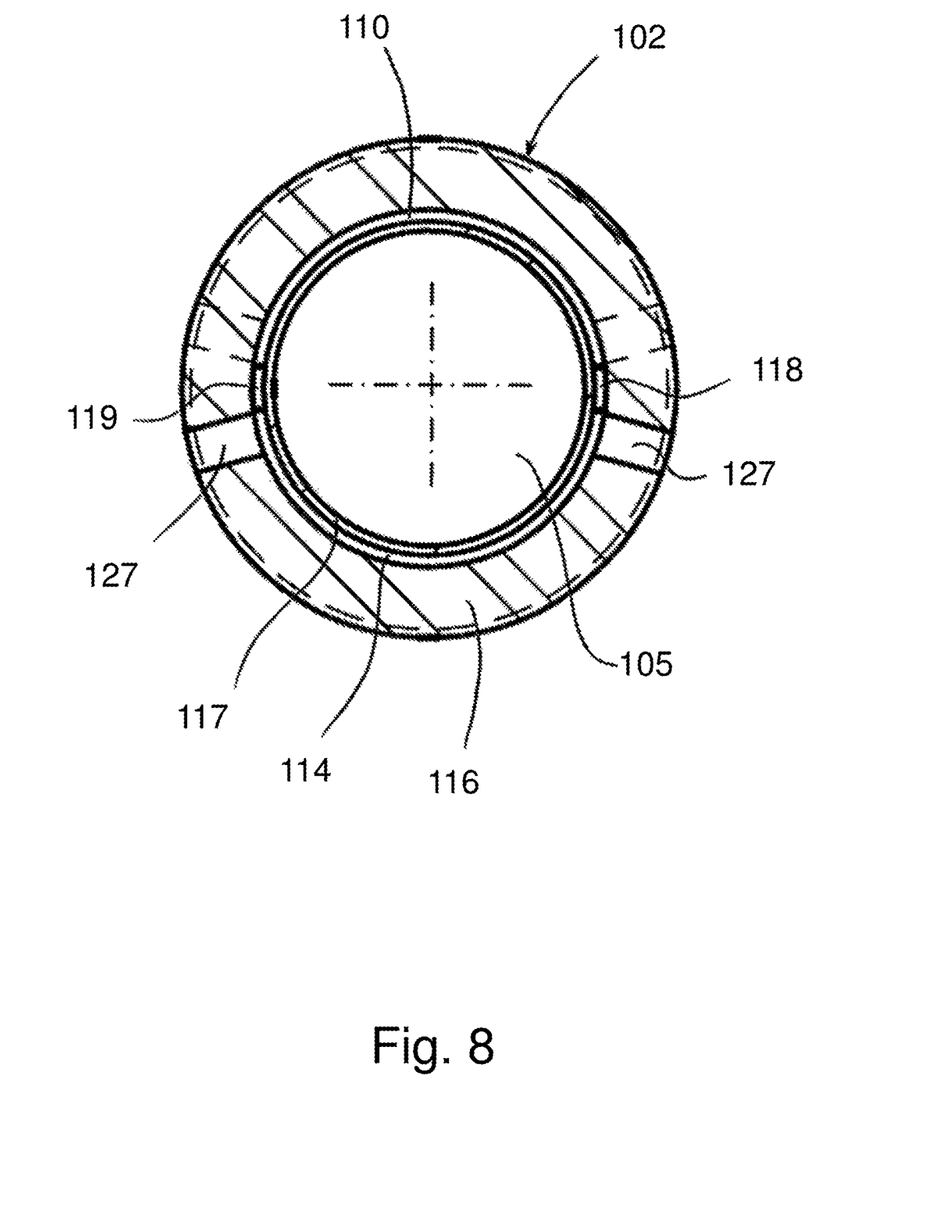
FIG. 8 shows a cross section D-D of the rotary leadthrough according to FIG. 3.
Figure 9:
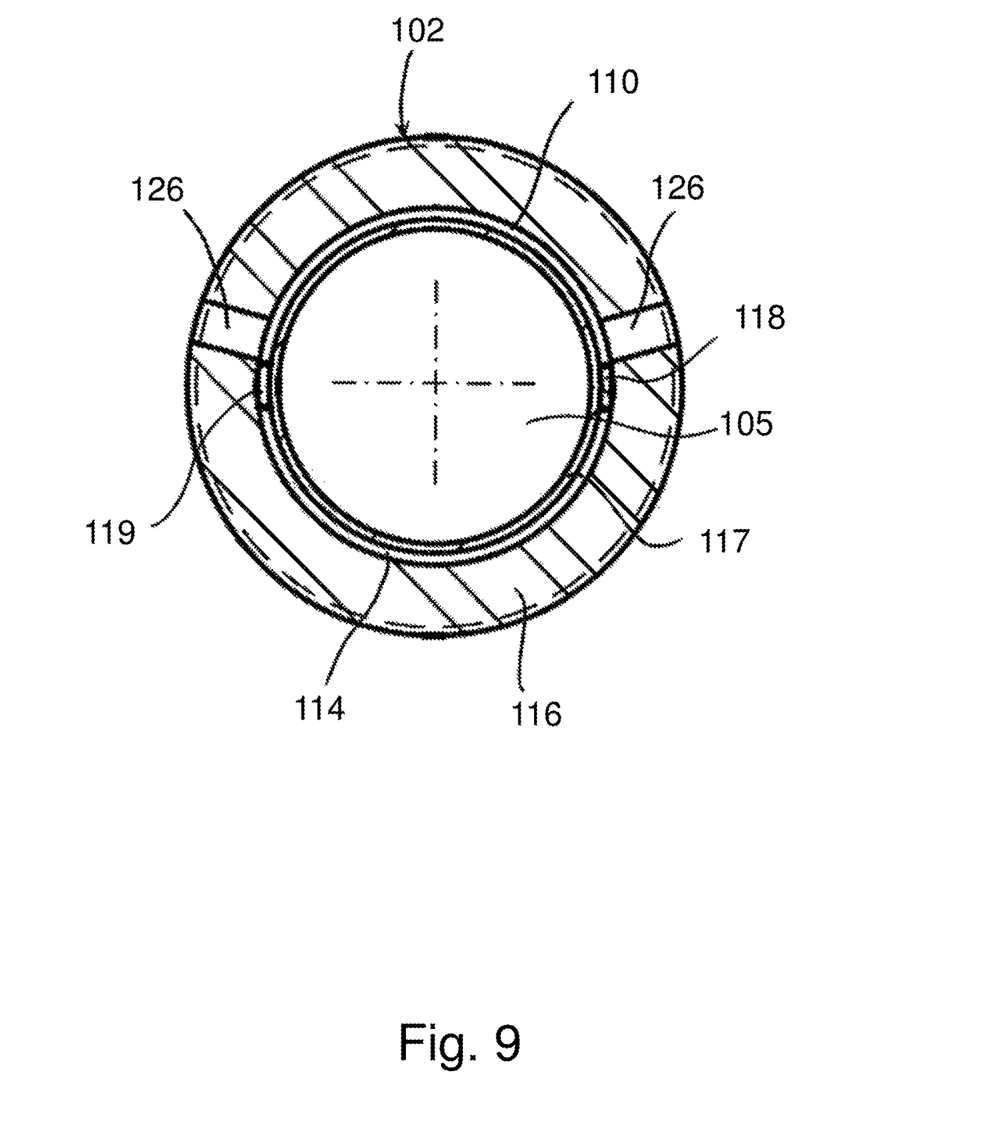
FIG. 9 shows a cross section E-E of the rotary leadthrough according to FIG. 3.

Rotary leadthrough 100 is assigned to supply opening 205 of container 200. Rotary leadthrough 100 comprises a connection module 101 and a rotary module 102 as essential structural components. Rotary module 102 is surrounded in sections by connection module 101 on the jacket side. Rotary module 102 is rotatably held around rotation axis 300. It provides a rotating body 116 manufactured as a rotary part, which includes a longitudinal recess and a sleeve 117 inserted into the longitudinal recess of rotating body 116. Rotating body 116 and sleeve 117 are rotatably fixedly connected to each other.

A first leadthrough channel 105 for the food is formed on rotary leadthrough 100 according to the invention coaxially to rotation axis 300 in the area of the longitudinal recess. The food enters first leadthrough channel 105 via a through-opening 128. In the area of rotary module 102, first leadthrough channel 105 is delimited first by sleeve 117 and then by rotating body 116 on the jacket side.

In addition to first leadthrough channel 105, a second leadthrough channel 106 is provided on rotary leadthrough 100 according to the invention as a feed line for the fluid conducted in fluid channel 201 of container 200, and a third leadthrough channel 107 is provided as a return line for the fluid. Second leadthrough channel 106 provides an inlet opening 108 on connection module 101, an annular gap 109 and an elongated feed section 110 for the fluid in an axial direction 305 defined by rotation axis 300. A connecting opening 111 for the fluid is provided between annular gap 109 and feed section 110. Third leadthrough channel 107 has a similar structure. It comprises an outflow opening 112 for the fluid, an annular gap 113 and an elongated discharge section 114 in axial direction 305 and a connecting opening 115 for the fluid provided between annular gap 113 and discharge section 114.

An intermediate body 120 is furthermore provided between connection module 101 and rotary module 102. Intermediate body 120 is rotatably fixedly held on rotating body 116 of rotary module 102. A first additional annular gap 121 and an additional connecting opening 122 for the fluid are provided on intermediate body 120 as part of second leadthrough channel 106. In addition, intermediate body 120 provides a second additional annular gap 123 and a second additional connecting opening 124 as part of third leadthrough channel 107 for the fluid.

Connection module 101 is supported against intermediate body 120 via two roller bearings 125. In addition, shaft sealing rings 130 are provided between connection module 101 and intermediate body 120 rotatable for this purpose around rotation axis 300 for sealing leadthrough channels 105, 106, 107.

Connection module 101 is secured against rotation by a retaining arm 129.

While the food enters first leadthrough channel 105 via through-opening 128 and passes from there to container 200 of the tumbler, second leadthrough channel 106 and third leadthrough channel 107 are used as feed lines and return lines for the fluid. The fluid thus enters annular gap 109 via a fluid supply line 301 and inlet opening 108 of second leadthrough channel 106, from where it enters first additional annular gap 121 of intermediate body 120 via first additional connecting opening 122. The fluid flows out of first additional annular gap 121 through connecting opening 111 to feed section 110 of second leadthrough channel 106. The fluid enters fluid channel 201, which is provided in the area of a double jacket of container 200, from second leadthrough channel 106 via two first connection openings 126.

The fluid flows out of fluid channel 201 via two second connection openings 127 into discharge section 114 of third leadthrough channel 107 and from there flows into second additional annular gap 123 of intermediate body 120 via connecting opening 115. The fluid flows from second annular gap 23 into annular gap 13 of third leadthrough channel 107 via second additional connecting opening 24. The fluid flows back from annular gap 13 via outflow opening 12 and a fluid discharge line 302.

Feed section 110 of second leadthrough channel 106 and discharge section 114 of third leadthrough channel 107 have a ring-segment-shaped or half-shell-shaped design. They surround first leadthrough channel 105 on the jacket side. Two webs 118, 119 are provided between second leadthrough channel 106 and third leadthrough channel 107. Webs 118, 119 separate second leadthrough channel 106 and third leadthrough channel 107 from each other. Webs 118, 119 extend between an outer jacket of sleeve 117 and an inner jacket of rotating body 116 of rotary module 102.

Sleeve 117, which is designed as part of rotary module 102, delimits first leadthrough channel 105 with an inner jacket thereof and second leadthrough channel 106 as well as third leadthrough channel 107 on the outer jacket side. Rotating body 116 delimits first leadthrough channel 105, second leadthrough channel 106 and third leadthrough channel 107 on the inner jacket side.

To operate the tumbler according to the invention, the food is supplied to container 200 in that air is pumped out of container 200 via extraction line 303, in particular with the aid of the pump, which is not illustrated, and as a result, food is sucked into container 200 from a storage vessel, which is not illustrated, via suction line 304. While container 200 is being filled with food in this manner, container 200 may rotate around rotation axis 300. At the same time, the fluid may be pumped through fluid channel 201 of container 200 via fluid supply line 301, fluid discharge line 302 as well as second and third leadthrough channels 106, 107, which are formed on rotary leadthrough 100.

Container 200 is emptied via removal opening. Removal door 204 is thus opened, and container 200 rotates around rotation axis 300. For example, container 200 may be additionally inclined during removal. In particular, transport components in container 200, for example helically formed metal sheets, may project inwardly from a container inner wall for removing the food. The fluid may continue to flow unchanged through fluid channel 201 while the food is being removed from container 200.

According to an alternative specific embodiment of the operating method according to the invention, it may be provided that container 200 is filled at a standstill and/or the fluid does not flow through fluid channel 201 during the filling of container 200 or during the removal of food from container 200.

It may be optionally provided that, in particular heated or cooled air is supplied as an additional fluid to container 200 via first leadthrough channel 105. A particularly effective cooling or heating of the food provided in container 200 may this take place during processing. The additional fluid may be discharged from container 200, for example via extraction line 303.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A tumbler for food, the tumbler comprising:
   a container adapted to receive food, the container comprising a fluid channel for food provided on a jacket side, a removal opening for the food provided on a first end face, a supply opening for the food provided on a second end face arranged opposite the first end face, and an extraction opening for a gas provided in container;
   a drive for rotating the container around a rotation axis;
   a rotary leadthrough assigned to the second end face, which comprises a connection module and a rotary module, which is provided to be rotatable with respect to the connection module and is rotatable around the rotation axis together with the container;
   a first leadthrough channel for the food, which is run to the supply opening and provided coaxially to the rotation axis;
   a second leadthrough channel provided as a feed line;
   a third leadthrough channel provided as a return line for the fluid, the second leadthrough channel having an inlet opening for the fluid provided on the connection module, an annular gap formed between the connection module and the rotary module, a feed section formed on the rotary module and a connecting opening formed between the annular gap and the feed section, the third leadthrough channel having an outlet opening for the fluid provided on the connection module, an annular gap formed between the connection module and the rotary module, a discharge section formed on the rotary module, and a connecting opening formed between the annular gap and the discharge section; and
   at least one seal for sealing off one of the leadthrough channels.

2. The tumbler according to claim 1, wherein the feed section of the second leadthrough channel and/or the discharge section of the third leadthrough channel are designed in the shape of a half shell and/or ring segment and/or are provided with an elongated design in an axial direction defined by the rotation axis.

3. The tumbler according to claim 1, wherein the feed section of the second leadthrough channel and/or the discharge section of the third leadthrough channel surround the first leadthrough channel on the jacket side in sections.

4. The tumbler according to claim 1, wherein the connection module surrounds the rotary module on the jacket side.

5. The tumbler according to claim 1, wherein the rotary module comprises a rotating body manufactured as a rotary part and a sleeve inserted into the rotating body, the feed section of the second leadthrough channel and/or the discharge section of the third leadthrough channel being formed between the rotating body and the sleeve, and the feed section of the second leadthrough channel and the discharge section of the third leadthrough channel being separated from each other by a web provided between the sleeve and the rotating body, which extends in an axial direction.

6. The tumbler according to claim 1, wherein the connecting openings of the second leadthrough channel and the third leadthrough channel are formed as part of the rotary module on the rotating body.

7. The tumbler according to claim 1, wherein an intermediate body rotatably fixedly connected to the rotary module is provided, which surrounds the rotary module in the area of the annular gaps of the second leadthrough channel and the third leadthrough channel on the jacket side, a first additional annular gap and a first additional connecting opening being formed on the intermediate body as part of the second leadthrough channel, as well as a second additional annular gap and a second additional connecting opening being formed as part of the third leadthrough channel for the fluid.

8. The tumbler according to claim 7, wherein the connection module is supported against the intermediate body via pivot bearings and/or via roller bearings.

9. The tumbler according to claim 7, wherein the at least one seal for sealing off one of the leadthrough channels are provided as shaft seals, the shaft seals being disposed between the connection module and the intermediate body to seal off one of the leadthrough channels from the other leadthrough channels.

10. The tumbler according to claim 1, wherein the second leadthrough channel has a first connection opening for the fluid, which is assigned to the feed section and is connected to the fluid channel of the container, and/or the third leadthrough channel provides a second connection opening for the fluid, which is assigned to the discharge section and is connected to the fluid channel of the container.

11. An operating method for a tumbler according to claim 1, the method comprising:
   extracting gas or air in the container of the tumbler from the container via a suction line, which is run to a suction opening of the container;
   sucking the food, as a result of the gas extraction, into the container via a suction line and a first leadthrough channel formed on a rotary leadthrough of the tumbler;

introducing a fluid into a fluid channel provided on the container on the jacket side through a second leadthrough channel formed on the rotary leadthrough;

discharging the fluid from a fluid channel provided on the container on the jacket side through a third leadthrough channel formed on the rotary leadthrough;

removing the food from the container through a removal opening provided on a first end face of the container, the rotary leadthrough including the leadthrough channels are provided on a second end face arranged opposite the first end face.

12. The operating method according to claim 11, wherein the fluid is conducted to the fluid channel of the container through the second leadthrough channel while the container is rotating around the rotation axis.

13. The operating method according to claim 11, wherein the fluid is discharged from the fluid channel of the container through the third leadthrough channel while the container is rotating around the rotation axis.

14. The operating method according to claim 11, wherein the food is filled into the container and/or removed from the container while the container is rotating around the rotation axis.

15. The operating method according to claim 11, wherein temperature-controlled air is supplied to the container as an additional fluid via the first leadthrough channel of the rotary leadthrough to heat and/or cool and/or defrost the food provided in the container, and/or wherein the additional fluid is discharged from the container via the extraction opening.

* * * * *